(No Model.)
R. BELFIELD.
SYSTEM OF ELECTRICAL TRANSLATION.
No. 380,846. Patented Apr. 10, 1888.
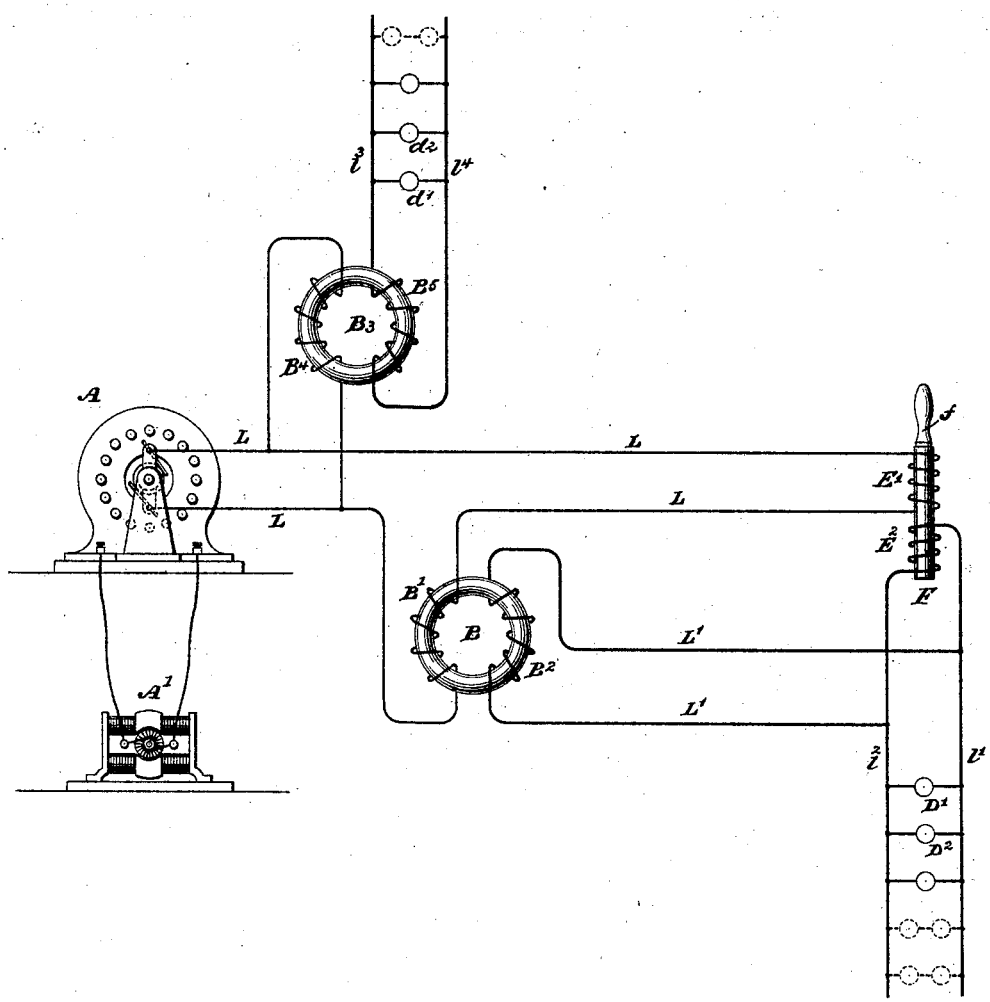
Witnesses
Geo. W. Breck
Carrie E. Ashley
Inventor,
Reginald Belfield
By his Attorneys
Pope Edgecomb & Ferry

UNITED STATES PATENT OFFICE.

REGINALD BELFIELD, OF PITTSBURG, PENNSYLVANIA, ASSIGNOR TO THE WESTINGHOUSE ELECTRIC COMPANY, OF SAME PLACE.

SYSTEM OF ELECTRICAL TRANSLATION.

SPECIFICATION forming part of Letters Patent No. 380,846, dated April 10, 1888.

Application filed June 9, 1887. Serial No. 240,688. (No model.)

*To all whom it may concern:*

Be it known that I, REGINALD BELFIELD, a subject of the Queen of Great Britain, residing in Pittsburg, in the county of Allegheny and State of Pennsylvania, have invented certain new and useful Improvements in Systems of Electric Translation, of which the following is a specification.

This invention relates, generally, to a method of and organization of apparatus for distributing electric energy and automatically governing the same.

It relates particularly to those systems of electric distribution in which alternating or such like electric currents derived from any suitable source of electrical energy are employed, such currents being usually transmitted through the primary coils of one or more inductoriums or converters, and the currents thereby induced in the secondary coils being employed for operating translating devices— such, for instance, as incandescing electric lights.

When the lights are connected in multiple arc with each other, it is necessary for the purpose of maintaining them at a constant brilliancy that the potential at the respective terminals thereof should remain approximately constant throughout the variations which may occur in the resistance of the translating-circuit.

The object of the present invention is to so organize a system of this general character as to automatically cause an approximately-constant difference of potential to be maintained upon the working-circuit and to readily permit of a decrease or increase of such potential as may be required at different times. Thus, for instance, in operating incandescing electric lights, it frequently occurs that the brilliancy at which it is desired to maintain the lights should be modified. For example, at times it may be required that the regulator should secure the proper supply of current for operating a large number of lights at their highest normal brilliancy, while at other times it may be desired to burn a single light at a very low candle-power, and between these limits any number of variations may be required.

The accompanying drawing is a diagram illustrating the general organization of circuits and apparatus adapted to carry out the invention.

Referring to the figure, A represents a magneto or dynamo electric generator or other convenient source of electric energy. The generator is designed to transmit alternating or such like currents upon a main line, L. An alternating machine whose field-magnets are supplied by a dynamo, A', will be found adapted to this purpose.

An induction apparatus, B, herein termed a "converter," has a primary coil, B', included in the primary circuit L. The coil $B^2$ is included in a secondary circuit, L', which supplies the current necessary to operate translating devices, such as incandescent electric lights D' $D^2$, &c. These last-named devices are connected in multiple arc between two supply-conductors, $l'$ and $l^2$. In other instances, however, it may be desired to include them in multiple series, as indicated in dotted lines. A regulating device consisting of a core, F, of soft iron, and two coils, E' and $E^2$, from which it is capable of being withdrawn, is employed. The coil E' is included in series with the coil B' of the converter. The coil $E^2$ is included in multiple arc with the coil $B^2$ and the translating devices D' $D^2$, &c.

The coils E' and $E^2$ are so wound and connected in circuit with reference to each other that the currents through them are in the same direction and tend to magnetize the core in the same direction. Therefore any increase or decrease of the current flowing through the coil $E^2$ will increase or decrease the counter electro-motive force developed in the coil E'. Thus it will be understood that should the machine A be so constructed as not to itself automatically maintain a constant difference of potential upon its circuit, then when certain of the translating devices D' $D^2$, &c., are cut out of circuit the difference of potential between $l'$ and $l^2$ will be increased. Consequently more current will flow through the coil $E^2$, thus increasing the counter electro-motive force of the coil E', thus diminishing the current in the coil B', and so again tending to diminish the current through the coil $B^2$ and securing the proper normal difference of potential between the conductors $l'$ and $l^2$, and vice versa. Again, should the difference of potential between the conductors L L be increased by cutting out translating devices or converters, the difference of potential between the conductors $l'$ and $l^2$ will still remain constant. Thus, if a converter, $B^3$, has its primary coil $B^4$ connected in multiple arc with coil $B'$ of the converter B and its secondary coil $B^5$ connected with conductors $l^3$ and $l^4$, between which there are arranged translating devices $d'$ $d^2$, &c., then by cutting out more or less of the translating devices $d'$ $d^2$, &c., the difference of potential between the conductors $l'$ and $l^2$ will be increased, thus increasing the flow of current through the coil $B'$, thus increasing the current in the coil $B^2$, thus raising the difference of potential between $l'$ and $l^2$, causing more current to flow through $E^2$, and so raising the counter electro-motive force in the coil $E'$, thus diminishing the current in the coil $B'$ and maintaining the normal difference of potential upon the circuit L L.

The relative portions of the core F and the coils $E'$ and $E^2$ are made adjustable with reference to each other—as, for instance, by a handle, $f$, or in any other convenient manner—and by this means any required brilliancy upon the part of the lamps $D'$ $D^2$ may be secured, the automatic regulation being still secured, as will be evident. This latter feature is of service also in instances where the generator produces currents of constant difference of potential.

I claim as my invention—

1. The combination, with a source of electric currents and a circuit therefor, of a converter having its primary coil connected in said circuit, translating devices connected in the secondary circuit of said converter, a soft-iron core, and two coils applied thereto, one of said coils being connected in series with said primary coil and the other in multiple arc with said secondary coil.

2. The combination, with a source of electric currents and a circuit therefor, of a converter having its primary coil connected in said circuit, translating devices connected in the secondary circuit of said converter, a soft-iron core, and two coils applied thereto, one of said coils being connected in series with said primary coil and the other in multiple arc with said secondary coil, and means for altering the relative action of said soft-iron core and its coils.

3. The combination, with a source of electric currents and a circuit therefor, of a converter having its primary coil connected in said circuit, translating devices connected in the secondary circuit of said converter, a soft-iron core, and two coils applied thereto, one of said coils being connected in series with said primary coil and the other in multiple arc with said secondary coil, and one or more converters in multiple arc with the first-named converter.

4. The combination, with a source of electric currents and a circuit therefor, of a converter having its primary coil connected in said circuit, translating devices connected in the secondary circuit of said converter, a soft-iron core, and two coils applied thereto, one of said coils being connected in series with said primary coil and the other in multiple arc with said secondary coil, means for altering the relative action of said soft-iron core and its coils, and one or more converters in multiple arc with the first-named converter.

In testimony whereof I have hereunto subscribed my name this 25th day of May, A. D. 1887.

REGINALD BELFIELD.

Witnesses:
DANL. W. EDGECOMB,
CHARLES A. TERRY.